United States Patent Office 3,565,653
Patented Feb. 23, 1971

3,565,653
SENSITIVE PIGMENT FOR PRESSURE-SENSITIVE RECORD MATERIAL
Glen A. Hemstock, Princeton, and Barry S. Miller, Roselle, N.J., assignors to Engelhard Minerals & Chemicals Corporation, Woodbridge, N.J., a corporation of Delaware
No Drawing. Filed Apr. 10, 1968, Ser. No. 727,128
Int. Cl. C09c 1/28
U.S. Cl. 106—288                                     3 Claims

ABSTRACT OF THE DISCLOSURE

Partially rehydrated metakaolin (a form of calcined clay) is ion-exchanged with a nickelous salt. The resulting nickel-exchanged aluminum silicate pigment reacts with various leuco dye material in a chromogenic reaction. The pigment is used in pressure-sensitive record material with reactive dye material.

BACKGROUND OF THE INVENTION

Certain pressure-sensitive record material utilizes the chemical reaction between leuco dye material coated on a transfer sheet and a reactive substance coated on a receiving sheet. Printing pressure transfers the leuco dye material to the receiving sheets as a result of the rupture of capsules or a film normally confining the dye material. When the transfer takes place, chemical reaction ocucrs and a printed mark is formed on the receiving sheets. A similar reaction may take place on self-contained record material in which the transfer and receiving coatings are superimposed.

One type of commercial sensitive record material makes use of the chromogenic reaction between attapulgite clay and a mixture of crystal violet lactone and benzoyl leuco methylene blue. The attapulgite clay is coated on receiving sheets and a multiplicity of pressure-rupturable capsules containing an oily solution of the dyes are coated on transfer sheets. A permanent blue mark is formed when the dyes come into adsorptive contact with the clay on the receiving sheets as a result of printing pressure. (See U.S. 2,730,456 to Barrett K. Green et al. and patents referred to therein.) Another type, supplied under the registered trademark "Type 200" by the Minnesota Mining and Manufacturing Company, utilizes a different dye system. A purple mark is formed when the dye on these transfer sheets is reacted with nickel ion. The nickel is provided by a nickel compound, understood to be a nickel salt of a fatty acid. A reactive pigment is not employed to develop the dye in this case.

THE INVENTION

An object of this invention is the provision of a novel reactive pigment for pressure-sensitive printing.

Another object is to provide versatile sensitive pigmented receiving sheets for pressure-sensitive record material.

Stated briefly, the novel sensitive pigment of the present invention is a white, acidic, high surface area, aluminum silicate having a $SiO_2/Al_2O_3$ molar ratio of about 2/1 and containing nickel in the form of ion-exchangeable nickelous ions. The nickel-exchanged aluminum silicate is a versatile pigment since it is sensitive to the various transferable dye systems above-mentioned.

Receiving sheets containing the nickel-exchanged aluminum silicate as a pigment have a smooth, white, opaque finish as a result of the presence of the white nickel-exchanged aluminum silicate pigment. These receiving sheets have a much whiter, brighter appearance than the attapulgite-coated receiving sheets presently used with the crystal violet lactone-benzoyl leucomethylene blue dye system. Further, pigmented sheets containing the nickel-exchanged aluminum silicate compare favorably in sensitivity to the attapulgite sheets. More copies may therefore be obtained with the former. The receiving sheets have superior smudging properties, as compared to the sheets presently used with "Type 200" transfer sheets. In other words, the sheets are less prone to become sensitized during handling prior to actual printing.

The pigment of the invention thus offers advantages when used with various dye systems.

DESCRIPTION

The novel, nickel-exchanged aluminum silicate pigment of the invention is obtained by ion-exchanging high surface area, partially rehydrated metakaolin with a nickelous salt and recovering the ion-exchanged product. The preparation of high surface area, partially rehydrated metakaolin is described in U.S. 3,224,892 to Glen A. Hemstock. Reference is made to said patent as to the details of the hydrothermal treatment and for definition of terms such as "metakaolin," "water of crystallization," "B.E.T. surface area," etc.

Briefly, finely divided metakaolin, a form of calcined clay described in the patent, is slurried in water. The slurry is heated under superatmospheric pressure until a desired amount of hydration occurs, the amount of water being less than the theoretical water of crystallization of kaolin clay (about 13.9% for pure kaolinite). Specifically, the metakaolin is rehydrated to a water of crystallization within the range of 4% to 13% by weight. Partial rehydration of metakaolin results in an increase in surface area, with surface area generally increasing to a maximum within the range of about 10% to 12% water of crystallization. Partially rehydrated metakaolin products having a B.E.T. surface area of at least 50 m.$^2$/g. are suitable. Products having a B.E.T. surface area of 300 m.$^2$/g. or above may be employed.

Preferably a saturated steam pressure within the range of 400 to 800 p.s.i.g. is used. Rehydration time is generally within the range of 1 to 10 hours at such pressures. The invention, however, is not limited to such rehydration conditions since suitable conditions may be determined experimentally. Reference is made to the disclosure of U.S. 3,224,892 to Hemstock (supra).

The partially rehydrated metakaolin may be substantially amorphous in the sense that it does not exhibit well-defined maxima when tested by standard X-ray diffraction procedure. Some partially rehydrated metakaolin products, also within the scope of the invention, contain characteristic kaolinite peaks. The presence or absence of kaolinite peaks will depend on the hydrothermal conditions used and the water of crystallization of the product. The kaolinite peaks appear with increasing intensity as the water of crystallization of the product approaches that of a fully hydrated kaolinite.

The partially rehydrated metakaolin products usually have base-exchange capacities within the range of about 10 to 50 meq./100 g. when tested by the procedure described by Truog, E. and Jackson, H. L., Proc. Soil Sci. Amer., 4, 136, 1398. Chemically the products are hydrated aluminum silicates.

The slip of rehydrated metakaolin from the hydrothermal treatment may be base-exchanged without further processing. Before ion-exchange, the slip may be further treated, as by filtering or drying, followed by grinding. If desired, the partially rehydrated metakaolin may be partially or fully dehydrated before it is subjected to the cation-exchange treatment. Temperatures up to about 1800° F. may be employed.

The ion-exchange treatment may be carried out with any soluble nickelous salt. Preferably the exchange is carried out in aqueous medium with a soluble nickel salt. The acetate, nitrate and sulfate salts are examples of water-soluble nickel salts. Conventional base-exchange techniques are suitable.

All or a portion of the exchangeable cations in the aluminum silicates obtained by the hydrothermal treatment of metakaolin may be replaced with nickelous ions during the ion-exchange treatment. The quantity of nickel present in the nickel aluminum silicate product will depend on the base-exchange capacity of the partially rehydrated metakaolin, and the amount of nickel salt employed. With a sample of partially rehydrated metakaolin having a base-exchange capacity of 25 meq./100 g. and nickel salt being used in amount to saturate the exchangeabel sites on the material (complete ion-exchange), the nickel content is about 1% Ni, based on the pigment weight. Generally speaking, the product will contain nickel (calculated as Ni) in amount within the range of about ¼% to 2% of the pigment weight.

After the base-exchange treatment, it is normally desirable to wash out unexchanged nickel salt.

The nickel-exchanged product has a distantly acidic pH. When tested in distilled water at 25° C. as a 25% solids suspension, pH is typically within the range of 4 to 5.

The nickel-exchanged aluminum silicate should be in the form of particles predominantly finer than 20 microns, preferably predominantly finer than 5 microns. (Particle sizes refer to values obtained by sedimentation in water.)

The nickel-exchanged aluminum silicate may be used as a coating or as a filler for pressure-sensitive record material. Conventional paper-making techniques are useful when employing the material as a filler. To provide coatings, the pigment may be dispersed in water and the pigment dispersion mixed with an aqueous suspension or solution of an adhesive binder, such as an acrylic latex or a styrene-butadiene latex. Suggested proportions are from 5 to 20 parts binder to 100 parts pigment, on a weight basis. Ammonia is a suitable dispersant with this particular pigment. The use of ammonia to disperse acidic adsorbent pigments during the preparation of coating compositions for pressure-sensitive receiving sheets is disclosed and claimed in a copending application of Barry S. Miller, Ser. No. 723,602, filed Apr. 23, 1968.

The following example is given for illustrative purposes.

A nickel-exchange partially rehydrated metakaolin pigment within the scope of this invention was prepared as follows.

A commercial metakaolin pigment ("Satintone #2") was slurried in deionized water in a 5-gallon stainless steel autoclave, using 15 lb. water and 2.60 lb. metakaolin. A chemical analysis of a representative sample of "Satintone #2" appears in U.S. 3,367,886 to Walter L. Haden, Jr., et al. The autoclave was sealed and the contents were heated to a saturated steam pressure of 500 p.s.i.g. The pressure was maintained at 500 p.si.g. for seven hours. After the autoclave had cooled, the contents were filtered dried in a forced air convection oven at 200° F to 250° F., jaw crushed and micropulverized. The average particle size was 2.35 microns. Surface area (B.E.T.) was 122 m.$^2$/g. and base-exchange capacity was 25 meq./100 g. Water of crystallization was 12.5% (wt.). The pH of a slurry of product was 4.4. An X-ray diffraction pattern showed kaolinite peaks; other diffraction maxima were not detectable in the pattern.

To base-exchange the high surface area, hydrothermally-treated metakaolin, a 200 g. sample was slurried with 2000 ml. of an aqueous solution of nickelous acetate containing 44.2 g. $Ni(C_2H_3O_2)_2 \cdot 4H_2O$ per liter. The mixture was agitated mildly for one hour at room temperature and decanted. The solids were washed on a filter with 4000 ml. distilled water and dried. The dried material was then micropulverized. The product was a white, nickel-exchanged hydrated aluminum silicate.

Receiving sheets for manifold printing with various color-reactant transfer sheets were prepared with the white nickel-exchanged hydrated aluminum silicate as the sensitive pigment. The following procedure was employed.

One hundred grams of the nickel-saturated aluminum silicate pigment was dispersed at about 40% solids in water containing ammonia in amount calculated to produce a finished coating composition having a pH of about 9. To the dispersion 10.6 g. "UCAR Latex 40" was added and the ingredients were thoroughly mixed. The latex employed is a 46% solids acrylic latex binder reported to have a pH within the range of 6.7 to 7.5 at 25° C. The color was screened through a 325 mesh (Tyler) screen. The resulting coating composition contained 40.0% solids and had a pH of 9.2.

Sheets of paper raw stock were coated with the coating color to produce a coat weight of 5 lb./3000 square feet. Coating was in the machine direction on the felt side. The sheets were calendered and air dried immediately after being coated. The dried sheets were cut into strips on a 6"×10" die and placed in a photoprint dryer with the coated side out for three minutes.

The dried sheets were immediately transferred to individual sealed polyethylene bags which were stored in a closed drawer in a room maintained at a substantially constant temperature of 73° F. and 50% R.H.

Quantitative evaluations of the sensitivity of the pigment on the coated sheets towards a mixture of crystal violet lactone and benzoyl leucomethylene blue were made as follows.

A commercial sheet of manifold printing paper that was uniformly coated with a microencapsulated solution of crystal violet lactone and benzoyl leucomethylene blue in chlorinated diphenyl oils was placed in face-to-face relationship with the coating on the pigment-coated receiving sheet. While the two sheets were in contact, they were passed through a calender under pressure sufficient to rupture the capsules on the transfer sheet, liberate the solution of dyes and form a printed image on the pigment-containing receiving sheet.

Sensitivity was determined by contrasting the printed and unprinted areas of the calendered sheets. The sensitivity testing involved separately determining the reflectances of the printed area and the background with a Bausch and Lomb Opacimeter with a green filter (572 m$\mu$ peak). A "calender intensity" value was then calculated in accordance with the following equation:

Percent calender intensity $$= \frac{\text{average reflectance of printed area} \times 100}{\text{average reflectance of background}}$$

A low calender intensity value therefore indicates a high contrast ratio of print to background and represents a sharp printed image. A high calender intensity value represents a low contrast ratio.

Calender intensity values were determined 30 seconds after calendering and 48 hours after testing. Since sharpness of print varies inversely with calender intensity value, an increase in the value after 48 hours aging indicates fading of the printed image. Conversely, a 48-hour value that is less than the 30-second value indicates a printed image that has become more intense with age.

The 30-second calender intensity value of a receiving sheet pigmented with the nickel-exchanged aluminum silicate pigment of the invention was 34. In comparison, the 30-second calender intensity value of commercial receiving sheets containing attapulgite clay as the reactive pigment is usually within the range of 50 to 55. A comparison of these data shows that the sheet containing the pigment of the present invention was appreciably more sensitive towards the dye system than the commercial sheet. This was confirmed by visual observation which also clearly indicated that the sheet coated with the nickel-exchanged pigment was whiter and brighter than the attapulgite-coated sheets. After 48 hours, the image on the sheet pigmented with the nickel-exchanged aluminum silicate was 31, indicating that the printed mark was much more intense than the image on an attapulgite sheet was after a comparable aging period.

Some of the receiving sheets containing the nickel aluminum silicate pigment were printed with "Type 200" transfer sheets using the calendering procedure described above. A permanent purple-colored image was formed.

The examples therefore illustrate the usefulness of a nickel-exchanged partially rehydrated metakaolin pigment as a constituent of various pressure-sensitive record material.

We claim:

1. As a new article of manufacture, a white, acidic nickel-containing aluminum silicate pigment having a $SiO_2/Al_2O_3$ molar ratio of 2/1 and containing nickel in exchangeable condition, said pigment having a B.E.T. surface area of at least 50 m.$^2$/g.

2. A method for making a pigment for pressure-sensitive record material which comprises maintaining finely divided partially rehydrated metakaolin having a B.E.T. surface area of at least 50 m.$^2$/g. in contact with an aqueous solution of a nickelous salt under ion-exchange conditions until ion-exchange takes place and recovering the ion-exchanged solid product.

3. As a new article of manufacture, a white, acidic hydrated nickel-containing aluminum silicate pigment having a $SiO_2/Al_2O_3$ molar ratio of 2/1, a water of crystallization within the range of 4% to 13% by weight, and containing nickel in exchangeable condition, said pigment having a B.E.T. surface area of at least 50 m.$^2$/g.

References Cited

UNITED STATES PATENTS

| | | | |
|---|---|---|---|
| 2,882,243 | 4/1959 | Milton | 23—112 |
| 3,224,892 | 12/1965 | Hemstock | 106—288I |
| 3,335,098 | 8/1967 | Haden et al. | 23—112 |

JAMES E. POER, Primary Examiner